June 16, 1942.  V. C. HALL  2,286,729
LIGHT MODULATION SYSTEM
Filed Feb. 13, 1941
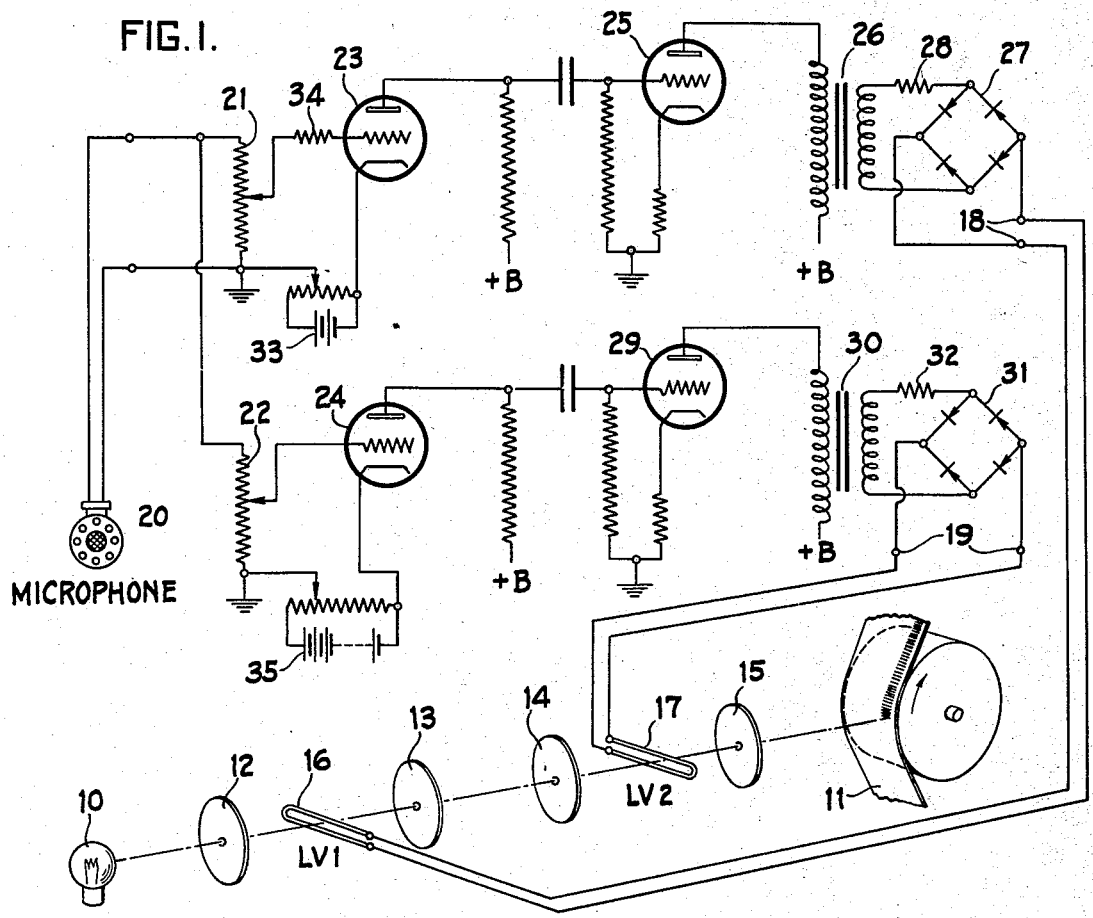
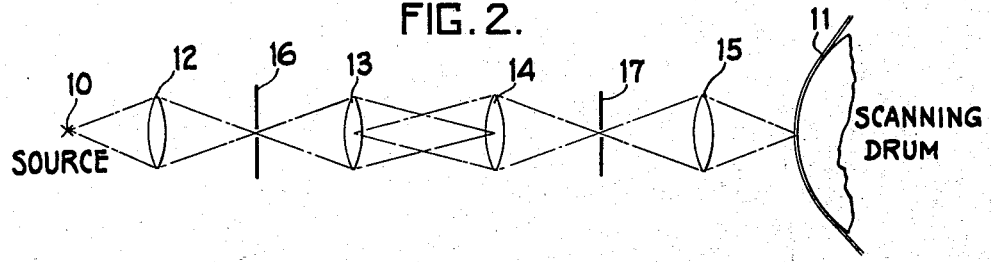
VINCENT C. HALL
INVENTOR
ATTORNEYS Patented June 16, 1942

2,286,729

UNITED STATES PATENT OFFICE 2,286,729

LIGHT MODULATION SYSTEM

Vincent C. Hall, Rochester, N. Y., assignor to Eastman Kodak Company, Rochester, N. Y., a corporation of New Jersey Application February 13, 1941, Serial No. 378,781

8 Claims. (Cl. 179—100.3)

This invention relates to a light modulating system and particularly to a system for recording signal currents on a photographic medium whereby the modulation range is greatly extended.

In any system for modulating a light beam and especially in producing a photographic image, such as in sound recording or the electrical transmission of pictures, the limited range of light intensities over which the light modulating system will operate satisfactorily is a serious factor. Thus, a glow lamp can be depended on for a range of light intensities of not over 60–1, while a light valve carefully adjusted may go to a range of 100–1, or even 200–1, but a valve is not usually consistent in its operation over such ranges.

The present invention which extends the range of modulation very materially makes use of two modulating systems, such as a glow lamp and light valve, or two light valves with a constant source, in series and so arranged that they operate over different selected intensity ranges of the currents controlling the modulation.

With the light modulating system according to the invention it is possible to obtain a range of light intensities as high as 40,000 to 1 so that by limiting the range of the valves to one over which they operate very satisfactorily, ranges of 1000–1 to 2000–1 can be obtained. This range is ample for sound recording and is sufficient for making color separation records from subtractive color pictures and the like.

In accordance with the invention, two light modulating devices are arranged serially in a light beam and one device is operated to capacity before the other device is called into action. In other words, the complete range of amplitudes of the modulating currents is divided into two ranges, one of which actuates exclusively one of the modulating devices, and the other range of which actuates exclusively the other of the modulating devices.

The invention will be fully understood from the following description when read in connection with the accompanying drawing and its scope will be pointed out in the appended claims.

In the drawing, Fig. 1 is a diagram illustrating the preferred form of the invention applied to the recording of sound, and Fig. 2 shows diagrammatically a suitable optical system for use with the invention.

As shown in the drawing, a light beam originating at a source 10 and falling on a photographic film 11 is defined by lenses 12, 13, 14 and 15 and two light valves 16 and 17. These two light valves 16 and 17 are connected to the output circuits 18 and 19, respectively, of two amplifiers, the input circuits of which are connected to a common source of modulated currents such as a microphone 20.

The signal from the microphone 20 is applied across two potentiometers 21 and 22 which control the voltage applied to the grids of tubes 23 and 24, respectively, of the amplifiers having the outputs 18 and 19. The tube 23 is connected to the light valve 16 through a power amplifier tube 25, a coupling transformer 26, a rectifier 27 and the output circuit 18. The rectifier 27 may be made linear by a suitable resistance 28. The tube 24 is similarly connected to the light valve 17 through a power tube 29, a coupling transformer 30, a rectifier 31 and the output circuit 19. A resistance 32 is used to make linear the rectifier 31.

A source of potential 33 serves to bias the grid of tube 23 to a value such that the grid goes positive at a voltage which will give sufficient signal to open completely the light valve 16. A resistor 34 is used to limit the positive voltages applied to the grid of tube 23.

A source of potential 35 for biasing the grid of the tube 24 is correlated to the adjustment of potentiometer 22 so that, for all signals less than those which will completely open the light valve 16, the grid of tube 24 is sufficiently negative to prevent the flow of plate current and therefore the light valve 17 is not energized. However, when the signal potential is high enough to make positive the grid of the tube 23, the voltage applied to the grid of the tube 24 is enough to render the tube 24 conducting and all signal currents in the range above this value are impressed on the light valve 17. Since the cut-offs of the two amplifiers will probably be not exactly sharp, they should be adjusted to give the desired shape of reproduction curve which should be substantially straight over most of the range.

The simplified form of a suitable optical system for use with the present invention shown conventionally in Fig. 2 is convenient for using two valves spaced serially in the light beam and operated in accordance with the invention.

It is to be understood that the invention is not restricted to the specific embodiment shown and described, since it was chosen for the purpose of illustrating the invention and many modifications will readily suggest themselves to those skilled in the art. Other amplifiers and other forms of light modulating devices may be employed for practicing the invention, the scope of which is pointed out in the appended claims.

What I claim as new and desire to secure by Letters Patent of the United States is:

1. In a sound recording system, means for translating sound modulated current into light values comprising a first light beam modulator supplied with sound modulated current, and a second light beam modulator supplied with sound modulated current only when the intensity of such current exceeds a predetermined value.

2. In a sound recording system, a pair of spaced light valves, means defining a beam of light which passes serially through the two light valves, an electrical network adapted when supplied with sound modulated current to apply to one of said valves substantially all of such current less than a predetermined intensity and to apply to the other of said valves all of such current in excess of said predetermined intensity.

3. In a system for recording signal currents on a photographic medium, a pair of modulators for the same light beam, an electric circuit for separating the signal currents into two intensity ranges and for applying the currents in one intensity range to one of the light modulators exclusively, the currents in the other intensity range being applied exclusively to the other light modulator.

4. In a system for recording signal currents on a photographic medium, the combination of a pair of modulators positioned in a light beam, an electric circuit adapted to be energized by signal currents for controlling one of said modulators in accordance with signal current intensity for changes in intensity within a predetermined range, and for controlling the other of said modulators in accordance with signal current intensity for changes in intensity within a predetermined different range.

5. In a system for recording modulated currents on a photographic medium, a light modulating means, means for varying the light falling on said light modulating means in accordance with the modulated currents throughout one range of amplitudes, and means for actuating said light modulating means in accordance with the modulated currents only throughout another range of amplitudes.

6. In a light beam modulator, the combination of two light valves spaced serially in the light beam, and an electric circuit for actuating said light valves in accordance with electric impulses supplied to the circuit, said circuit being so arranged that one of the light valves is actuated only by the portions of such impulses which lie above a predetermined intensity level.

7. A sound recording system comprising a source of alternating currents to be recorded, a light beam, a first means for directly modulating said beam with a certain range of amplitudes of said alternating currents, and a second means for directly modulating said beam with another range of amplitudes of said alternating currents.

8. A circuit comprising a source of alternating currents, two amplifiers having a common input circuit connected to the source of alternating currents, a pair of output circuits for said amplifiers, a light valve connected to each output circuit, one of said amplifiers having an initial bias different from the other of said amplifiers so that one of said amplifiers supplies currents to its associated light valve only over a predetermined range of amplitudes of said alternating currents.

VINCENT C. HALL.